US012789728B2

(12) United States Patent
Huang et al.

(10) Patent No.: US 12,789,728 B2
(45) Date of Patent: Nov. 10, 2026

(54) VEHICLE INTERIOR SYSTEM, CONTROL METHOD FOR VEHICLE INTERIOR SYSTEM, AND RELATED DEVICE

(71) Applicant: ZF ASIA PACIFIC AUTOMOTIVE SAFETY SYSTEMS (SHANGHAI) CO., LTD., Shanghai (CN)

(72) Inventors: Zhiwei Huang, Shanghai (CN); Xiang Li, Shanghai (CN); Taotao Jiang, Shanghai (CN); Yuanyi Cheng, Shanghai (CN)

(73) Assignee: ZF ASIA PACIFIC AUTOMOTIVE SAFETY SYSTEMS (SHANGHAI) CO., LTD., Shanghai (CN)

( * ) Notice: Subject to any disclaimer, the term of this patent is extended or adjusted under 35 U.S.C. 154(b) by 164 days.

(21) Appl. No.: 18/689,168

(22) PCT Filed: Sep. 5, 2022

(86) PCT No.: PCT/IB2022/058321
§ 371 (c)(1),
(2) Date: Mar. 5, 2024

(87) PCT Pub. No.: WO2023/031889
PCT Pub. Date: Mar. 9, 2023

(65) Prior Publication Data

US 2025/0242770 A1 Jul. 31, 2025

(30) Foreign Application Priority Data

Sep. 6, 2021 (CN) ......................... 202111038128.3
Sep. 6, 2021 (CN) ......................... 202122137732.3

(51) Int. Cl.
*B60R 16/037* (2006.01)
*B60N 2/02* (2006.01)
(Continued)

(52) U.S. Cl.
CPC .......... *B60R 16/037* (2013.01); *B60N 2/0268* (2023.08); *B60N 2/06* (2013.01);
(Continued)

(58) Field of Classification Search
CPC ...... B60R 16/037; B60N 2/0268; B60N 2/06; B60N 2/268; B60N 2210/24;
(Continued)

(56) References Cited

U.S. PATENT DOCUMENTS 4,922,426 A 5/1990 Obara et al.
7,172,249 B2 * 2/2007 Rausch .................. B60N 2/123 297/341
(Continued)

FOREIGN PATENT DOCUMENTS

EP 3771619 A1 2/2021
JP 2007131138 A 5/2007
(Continued)

OTHER PUBLICATIONS

PCT International Search Report for corresponding International Application Serial No. PCT/IB2022/058321, mailed Dec. 5, 2023, pp. 1-7.

*Primary Examiner* — Fadey S. Jabr
*Assistant Examiner* — Faris Asim Shaikh
(74) *Attorney, Agent, or Firm* — Tarolli, Sundheim, Covell & Tummino LLP

(57) ABSTRACT

The present invention relates to the technical field of automotive intelligent cockpits, and provides a vehicle interior system, a control method for a vehicle interior system, and a related device. The vehicle interior system includes: a flexible interior assembly including: a collapsible steering wheel, a retractable steering column, and a movable seat, where the interior assembly has an in-service state and a received state, and the interior assembly is capable of
(Continued)

switching motion between the in-service state and the received state; a sensor assembly, a detection range of which covers the interior assembly; and an electronic control unit connected to each of the interior assembly and the sensor assembly. According to the present invention, an integration design of the interior assembly can be implemented, and the interior assembly can flexibly switch between the in-service state and the received state, thereby improving user experience.

13 Claims, 12 Drawing Sheets

(51) Int. Cl.

| | |
|---|---|
| ***B60N 2/06*** | (2006.01) |
| ***B60N 2/26*** | (2006.01) |
| ***B62D 1/181*** | (2006.01) |
| ***B62D 1/183*** | (2006.01) |

(52) U.S. Cl.
CPC ............. *B62D 1/181* (2013.01); *B62D 1/183* (2013.01); *B60N 2/268* (2023.08)

(58) Field of Classification Search
CPC ...... B60N 2210/40; B60N 2/002; B60N 2/14; B62D 1/181; B62D 1/183; B62D 15/02; B60W 60/00; B60W 10/20; G05D 1/0061; G05D 1/0212; G05D 15/00; G05D 15/01; G05D 17/02; G05D 17/00; G05B 2219/35465
See application file for complete search history.

(56) References Cited

U.S. PATENT DOCUMENTS 11,603,128 B2* 3/2023 Suzuki .................... B62D 6/002
11,926,314 B2* 3/2024 Inoue ..................... B60W 30/06
2002/0047675 A1* 4/2002 Hein .................... B60N 2/0248 318/34
2003/0116362 A1* 6/2003 Breed .................. B60N 2/0252 177/144
2006/0090952 A1* 5/2006 Ito ...................... B62D 15/0235 180/446
2007/0236065 A1* 10/2007 Hofmann ............... B60N 2/085 297/344.1
2015/0134201 A1* 5/2015 Lavoie ................. B62D 15/027 701/41
2015/0142247 A1 5/2015 Rao et al.
2016/0121805 A1* 5/2016 Forsgren ................ B60K 35/50 348/837
2016/0200344 A1* 7/2016 Sugioka ................. B62D 1/181 701/49
2017/0003683 A1* 1/2017 Sato .................. B60W 60/0053
2017/0101032 A1* 4/2017 Sugioka ................. B60N 2/763
2017/0106903 A1* 4/2017 Moretti ................ B62D 5/0472
2017/0297606 A1 10/2017 Kim et al.
2017/0351256 A1* 12/2017 Kumakiri .......... B60W 60/0053
2018/0072343 A1* 3/2018 Sugita ..................... B62D 5/008
2018/0370558 A1* 12/2018 Buzzard ................. B62D 1/183
2019/0071079 A1* 3/2019 Nishiguchi ........... B60W 10/20
2019/0241205 A1* 8/2019 Toyama ................... B62D 1/10
2019/0381962 A1 12/2019 Sheldon et al.
2020/0101998 A1* 4/2020 Nishimura ................ G06T 7/70
2020/0130723 A1 4/2020 Cao et al.
2020/0139991 A1* 5/2020 Kim ..................... G05D 1/0061
2020/0276916 A1* 9/2020 Kieser ....................... B60N 2/04
2021/0031823 A1* 2/2021 Watanabe .............. B62D 1/183
2021/0179160 A1* 6/2021 Bezeault ................ B62D 1/183
2021/0206393 A1* 7/2021 Yang .................... B60N 2/0244
2022/0033000 A1* 2/2022 Koo ....................... B62D 15/02
2022/0169288 A1* 6/2022 Kim ....................... B62D 1/183
2022/0185337 A1* 6/2022 Ming ................ B60W 60/0057
2022/0203968 A1* 6/2022 Nakagawa ............ B60W 10/20
2022/0242482 A1* 8/2022 Kim ..................... B62D 5/0463
2022/0274639 A1* 9/2022 Park ....................... B62D 1/185
2022/0306189 A1* 9/2022 Ojima ................ B62D 15/0295
2023/0286523 A1* 9/2023 Dumas ................ B60W 40/068
2024/0300566 A1* 9/2024 Cimatti ................ B60K 35/212
2024/0300569 A1* 9/2024 Cimatti .................. B60K 35/10

FOREIGN PATENT DOCUMENTS

WO 2019/110878 A1 6/2019
WO 2020/172411 A1 8/2020

* cited by examiner

VEHICLE INTERIOR SYSTEM, CONTROL METHOD FOR VEHICLE INTERIOR SYSTEM, AND RELATED DEVICE

RELATED APPLICATIONS

This application is a U.S. National Stage Application filed under 35 USC 371, claiming priority to Serial No. PCT/IB2022/058321, filed on 5 Sep. 2022; which claims priority from Patent Application 202111038128.3, filed 6 Sep. 2021, and Patent Application 202122137732.3, filed 6 Sep. 2021, the entireties of which are hereby incorporated herein by reference.

TECHNICAL FIELD

The present invention relates to the technical field of automotive intelligent cockpits, and in particular, to a vehicle interior system, a control method for a vehicle interior system, and a related device.

BACKGROUND ART

With the continuous development of intelligence technologies, current automobiles are often equipped with intelligent cockpits to improve driver and passenger experience. In an intelligent cockpit of an automobile, an interior such as a steering wheel can be adjusted as needed. For example, the steering wheel can be retracted into a centre console to make more cockpit space.

However, the current interior has a relatively limited function, usually only with a collapsible steering wheel that cannot flexibly move, which is not conducive to the integration and functionality design of the intelligent cockpit.

It should be noted that information disclosed in the above background art section is only used to enhance the understanding of the background of the present invention, and therefore may include information that does not constitute the prior art known to those of ordinary skill in the art.

SUMMARY OF THE INVENTION

In view of this, the present invention provides a vehicle interior system, a control method for a vehicle interior system, and a related device, so that an integration design of an interior assembly can be implemented, and the interior assembly can flexibly switch between an in-service state and a received state, thereby improving user experience. This is conducive to the integration and functionality design of an intelligent cockpit.

An aspect of the present invention provides a vehicle interior system, including: a flexible interior assembly including: a collapsible steering wheel, a retractable steering column, and a movable seat, where the interior assembly has an in-service state and a received state, and the interior assembly is capable of switching motion between the in-service state and the received state; a sensor assembly, a detection range of which covers the interior assembly; and an electronic control unit connected to each of the interior assembly and the sensor assembly.

In some embodiments, the steering wheel includes a body portion and a collapsing portion, and the collapsing portion is connected to the body portion by means of a collapsing connector; and the interior assembly further includes a collapsing motor for driving the steering wheel to collapse, and the collapsing motor is connected to the collapsing connector.

In some embodiments, the collapsing connector is composed of a hinge.

In some embodiments, the steering column is connected to the body portion; and the interior assembly further includes an extending and retracting motor for driving the steering column to extend and retract, and the extending and retracting motor is connected to the steering column.

In some embodiments, the seat is mounted in a vehicle by means of a slide rail mechanism; and the interior assembly further includes a slide motor for driving the seat to move, and the slide motor is connected to the slide rail mechanism.

In some embodiments, the electronic control unit is connected to a driving motor of the interior assembly.

In some embodiments, the received state includes a first received state and a second received state, and a receiving travel for the first received state is greater than a receiving travel for the second received state.

In some embodiments, the sensor assembly includes at least one TOF camera arranged in a vehicle.

Another aspect of the present invention provides a vehicle, and the vehicle is equipped with the vehicle interior system according to any one of the foregoing embodiments.

In some embodiments, the vehicle is an autonomous vehicle, and during travelling of the autonomous vehicle, a trigger button for the received state is turned on only in an autonomous driving mode.

Still another aspect of the present invention provides a control method for a vehicle interior system, the control method including: generating an interior control signal based on a travelling mode of a vehicle, where the interior control signal carries parameter information representing a driving force, a target motion trajectory, and a target position; driving, by using the driving force, an interior assembly of the vehicle to switch motion between an in-service state and a received state; and monitoring a current motion trajectory of the interior assembly, when the current motion trajectory matches the target motion trajectory, maintaining the driving force until the interior assembly moves to the target position and is then locked, and when the current motion trajectory does not match the target motion trajectory, performing impedance intervention on the driving force.

In some embodiments, the performing impedance intervention on the driving force includes: obtaining a position difference between the current motion trajectory and the target motion trajectory at a current moment; when the current motion trajectory lags behind the target motion trajectory, increasing the driving force based on the position difference, and returning to monitoring the current motion trajectory of the interior assembly; and when the current motion trajectory precedes the target motion trajectory, decreasing the driving force based on the position difference, and returning to monitoring the current motion trajectory of the interior assembly.

In some embodiments, after the driving force is increased, when it is detected that the current motion trajectory does not match the target motion trajectory, the control method further includes: determining whether the increased driving force reaches a preset maximum value; if the increased driving force reaches the preset maximum value, stopping providing the driving force such that the interior assembly stops moving; and resetting the interior control signal when a number of times the interior assembly stops is less than a preset number of times, and controlling, when the number of times the interior assembly stops reaches the preset number of times, the interior assembly to move in a reverse direction; and if the increased driving force does not reach the preset maximum value, returning to increasing the driving force until the interior assembly moves to the target position.

In some embodiments, the controlling, when the number of times the interior assembly stops reaches the preset number of times, the interior assembly to move in a reverse direction includes: generating a reverse control signal based on a current position of the interior assembly, where the reverse control signal carries parameter information representing a reverse driving force, a reverse motion trajectory, and an initial position; determining whether an interference force acting on the interior assembly is less than a preset value; if the interference force is less than the preset value, maintaining the reverse driving force, and controlling the interior assembly to move to the initial position along the reverse motion trajectory and then to be locked; and if the interference force is not less than the preset value, stopping providing the driving force such that the interior assembly stops moving, and locking the interior assembly in a stop position of the interior assembly.

In some embodiments, when the current motion trajectory lags behind the target motion trajectory, the control method further includes: detecting a type and position of an obstacle acting on the interior assembly; and determining a motion speed of the reverse motion trajectory and a value of the maximum value based on the type and position of the obstacle, so that when a human body is clamped, the motion speed of the reverse motion trajectory is greater than a motion speed of the target motion trajectory, and the value of the maximum value when the obstacle is a human body is less than the value of the maximum value when the obstacle is an object.

In some embodiments, the driving force is adjusted based on the position difference, a mass of the interior assembly, an interference force acting on the interior assembly, and an internal impedance of the interior assembly; and the driving force is in direct proportion to each of the position difference, the mass of the interior assembly, the interference force acting on the interior assembly, and the internal impedance of the interior assembly.

In some embodiments, after the driving force is decreased, when it is detected that the current motion trajectory does not match the target motion trajectory, the control method further includes: determining whether the decreased driving force reaches a preset minimum value; if the decreased driving force reaches the preset minimum value, stopping providing the driving force such that the interior assembly stops moving, and locking the interior assembly in a stop position of the interior assembly; and if the decreased driving force does not reach the preset minimum value, returning to decreasing the driving force until the interior assembly moves to the target position.

In some embodiments, the travelling mode includes a start mode and an autonomous driving mode, and the interior control signal includes an interior in-service signal and an interior receiving signal; in the start mode, the interior in-service signal is generated; and in the autonomous driving mode, the interior receiving signal is generated.

In some embodiments, the interior assembly includes a flexible steering assembly and a movable driving seat, and in the start mode, the control method further includes: detecting a seat belt of the driving seat and a seated pressure; and when a seat belt fastened signal of the driving seat is detected, generating a first interior in-service signal that controls the steering assembly, and generating, based on a preset mapping relationship between the seated pressure and a motion distance of the driving seat, a second interior in-service signal that controls the driving seat.

In some embodiments, in the autonomous driving mode, the control method further includes: detecting a travelling control signal of the vehicle; when an emergency braking signal is detected, generating an emergency deployment signal that controls the steering assembly, where an emergency deployment speed corresponding to the emergency deployment signal is greater than a motion speed corresponding to the first interior in-service signal, and a locked position of the emergency deployment signal is beyond a target position of the first interior in-service signal; and controlling, based on the emergency deployment signal, the steering assembly to perform emergency deployment to the locked position, and controlling an airbag on the steering assembly to be ejected during the emergency deployment.

In some embodiments, the control method for a vehicle interior system is used to control the vehicle interior system according to any one of the foregoing embodiments.

Yet another aspect of the present invention provides a control apparatus for a vehicle interior system, the control apparatus including: a signal generation module configured to generate an interior control signal based on a travelling mode of a vehicle, where the interior control signal carries parameter information representing a driving force, a target motion trajectory, and a target position; a driving control module configured to drive, by using the driving force, an interior assembly of the vehicle to switch motion between an in-service state and a received state; and a real-time monitoring module configured to monitor a current motion trajectory of the interior assembly, so that when the current motion trajectory matches the target motion trajectory, the driving control module maintains the driving force until the interior assembly moves to the target position and is then locked, and when the current motion trajectory does not match the target motion trajectory, performs impedance intervention on the driving force.

Still yet another aspect of the present invention provides an electronic device, including: a processor; and a memory storing executable instructions, where when the executable instructions are executed by the processor, the control method for a vehicle interior system according to any one of the foregoing embodiments is implemented.

A further aspect of the present invention provides a computer-readable storage medium for storing a program, where when the program is executed by a processor, the control method for a vehicle interior system according to any one of the foregoing embodiments is implemented.

Compared with the prior art, the present invention at least has the beneficial effects as follows:

In the vehicle interior system according to the present invention, the flexible interior assembly includes the collapsible steering wheel, the retractable steering column, and the movable seat, which implement an integration design, improve an integration level and functionality of the vehicle interior system, and simplify a structure of the vehicle interior system; the interior assembly has the in-service state and the received state, and can switch motion between the in-service state and the received state; and the interior assembly is detected by the sensor assembly and is controlled by the electronic control unit, so that the sensor assembly can be used to monitor motion of the interior assembly in real time, and the electronic control unit can be used to adjust the motion of the interior assembly in time, to ensure that the interior assembly moves stably and accurately to improve user experience.

In the control method for a vehicle interior system according to the present invention, when the interior assembly is controlled to move between the in-service state and the received state, the current motion trajectory of the interior assembly is monitored in real time, and when the current motion trajectory of the interior assembly does not match the target motion trajectory, the motion of the interior assembly can be adjusted in real time in the actual scenario to ensure that the interior assembly moves stably and accurately to the target position; and when the interior assembly is interfered with by a foreign object, response can be made in time to avoid damage to the interior assembly, prevent an occupant from being injured, and improve user experience.

It should be understood that the above general description and the following detailed description are only exemplary and explanatory, and cannot limit the present invention.

BRIEF DESCRIPTION OF THE DRAWINGS

The accompanying drawings herein, which are incorporated into and constitute a part of the description, illustrate embodiments consistent with the present invention and, together with the description, are used to explain principles of the present invention. Obviously, the accompanying drawings described below show merely some of the embodiments of the present invention, and those of ordinary skill in the art would also have obtained other accompanying drawings according to these accompanying drawings without any creative effort.

DETAILED DESCRIPTION OF EMBODIMENTS

Figure 1:
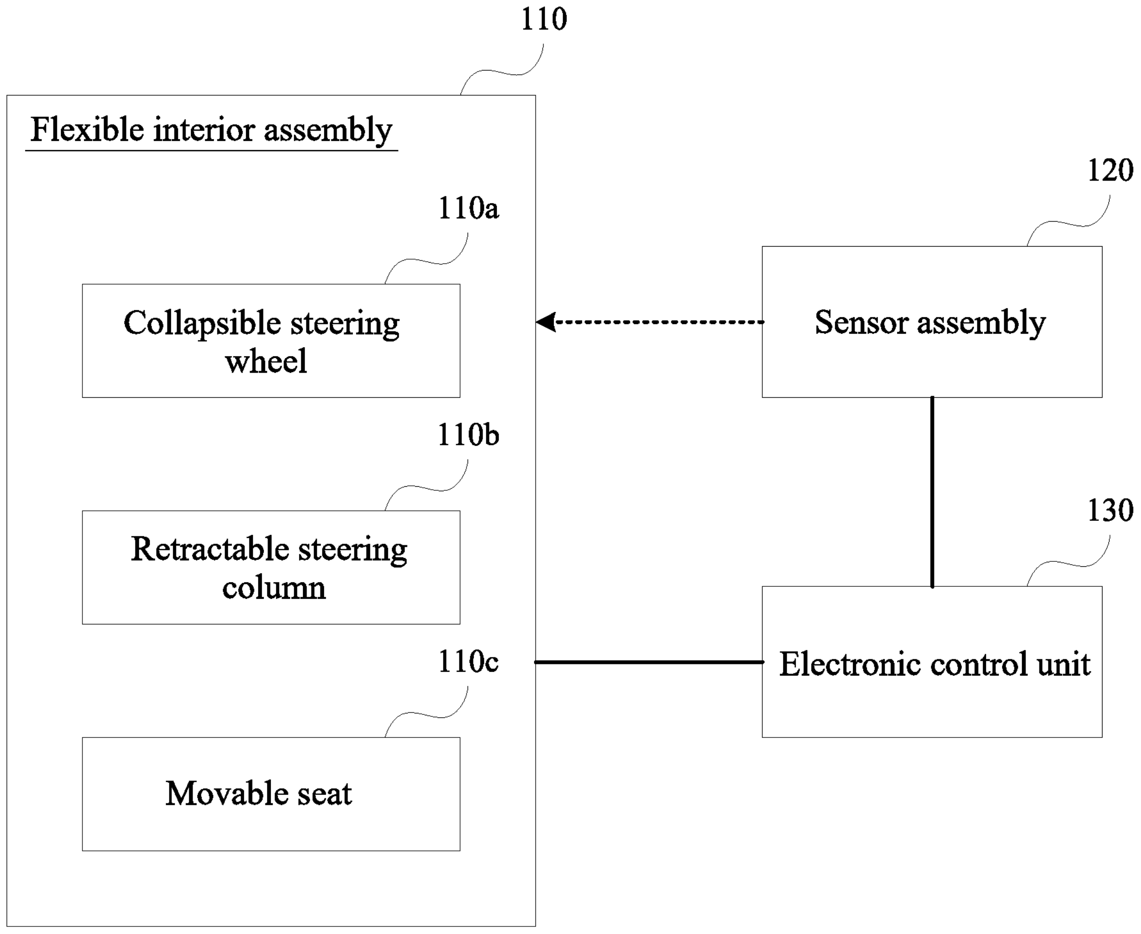
FIG. 1 is a schematic diagram of constituent modules of a vehicle interior system according to an embodiment of the present invention.

Now exemplary implementations will be described more fully with reference to the accompanying drawings. However, the exemplary implementations can be implemented in many forms and should not be construed as being limited to the implementations set forth herein. On the contrary, these implementations are provided to make the present invention thorough and complete, and to fully convey the concept of the exemplary implementations to those skilled in the art.

The accompanying drawings are only schematic illustrations of the present invention, and are not necessarily drawn to scale. In the accompanying drawings, the same reference numerals denote the same or similar parts, and thus the repeated description thereof will be omitted. Some block diagrams shown in the accompanying drawings are functional entities, which do not necessarily correspond to physically or logically independent entities. These functional entities may be implemented in the form of software, in one or more hardware modules or integrated circuits, or in different networks and/or processor apparatuses and/or micro-controller apparatuses.

In addition, the flow shown in the accompanying drawings is only an exemplary illustration, and does not necessarily include all steps. For example, some steps can be divided, and some steps can be combined or partially combined, and the actual execution order thereof may be changed based on actual conditions. The terms "first", "second" or the like used in the specific description do not denote any order, quantity, or importance, but are merely used to distinguish different components. It should be noted that the embodiments in the present invention and features of the various embodiments can be combined with each other without conflict.

FIG. 1 shows main constituent modules of a vehicle interior system according to an embodiment. Referring to FIG. 1, the vehicle interior system includes: a flexible interior assembly 110 specifically including: a collapsible steering wheel 110*a*, a retractable steering column 110*b*, and a movable seat 110*c*, where the interior assembly 110 has the in-service state and the received state, and the interior assembly 110 can switch motion between the in-service state and the received state; a sensor assembly 120, a detection range of which covers the interior assembly 110; and an electronic control unit 130 connected to each of the interior assembly 110 and the sensor assembly 120.

The foregoing flexible interior assembly 110 is integrated with the collapsible steering wheel 110*a*, the retractable steering column 110*b*, and the movable seat 110*c*, which can improve an integration level and functionality of the vehicle interior system, and can simplify a structure of the vehicle interior system.

Structures of the collapsible steering wheel 110*a*, the retractable steering column 110*b*, and the movable seat 110*c* are respectively specifically described below.

Figure 2:
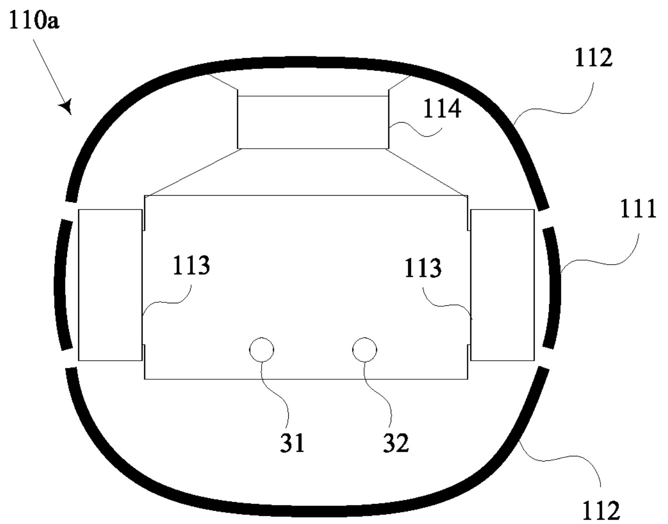
FIGS. 2 to 4 are schematic structural diagrams of a collapsible steering wheel according to an embodiment of the present invention.
Figure 3:
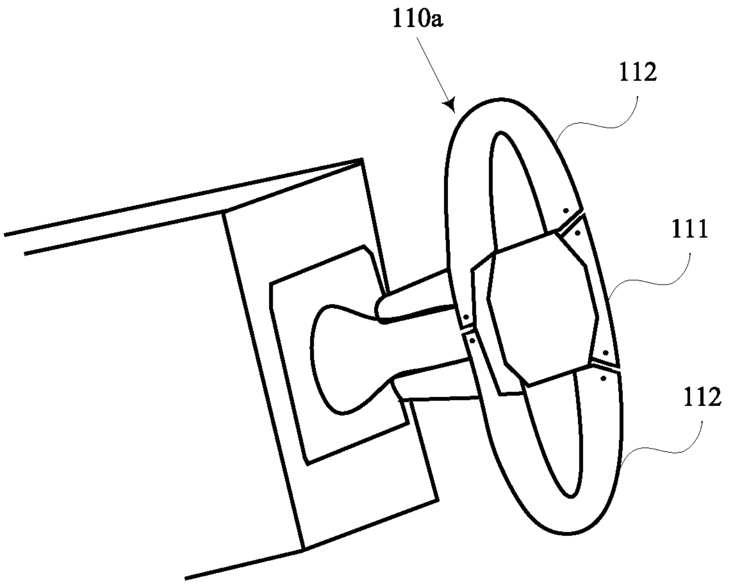
Figure 4:
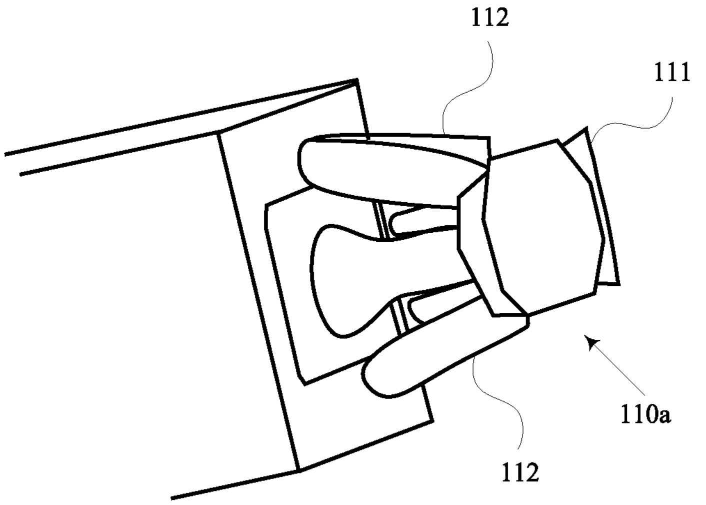

FIG. 2 shows a structure of the collapsible steering wheel 110*a* according to an embodiment, FIG. 3 shows the in-service state of the collapsible steering wheel 110*a*, and FIG. 4 shows the received state of the collapsible steering wheel 110*a*. With reference to FIGS. 2 to 4, in an embodiment, the collapsible steering wheel 110*a* includes a body portion 111 and a collapsing portion 112, and the collapsing portion 112 is connected to the body portion 111 by means of the collapsing connector (not specifically shown in the figure). The interior assembly further includes a collapsing motor 113 for driving the steering wheel 110*a* to collapse, and the collapsing motor 113 is connected to the collapsing connector. The collapsing motor 113 can drive the collapsing connector to deploy, so that the collapsible steering wheel 110*a* is brought into the in-service state shown in FIG. 3 for a driver to manipulate. The collapsing motor 113 can also drive the collapsing connector to collapse, so that the collapsible steering wheel 110*a* is brought into the received state shown in FIG. 4 to make more cockpit space.

The collapsing connector may be specifically composed of a hinge, or may be another collapsible structural component. The collapsible steering wheel 110*a* may be further provided with a hands-off detection apparatus 114 to detect whether the hands of the driver accurately control the steering wheel 110*a* in a driver manipulation mode.

Figure 5:
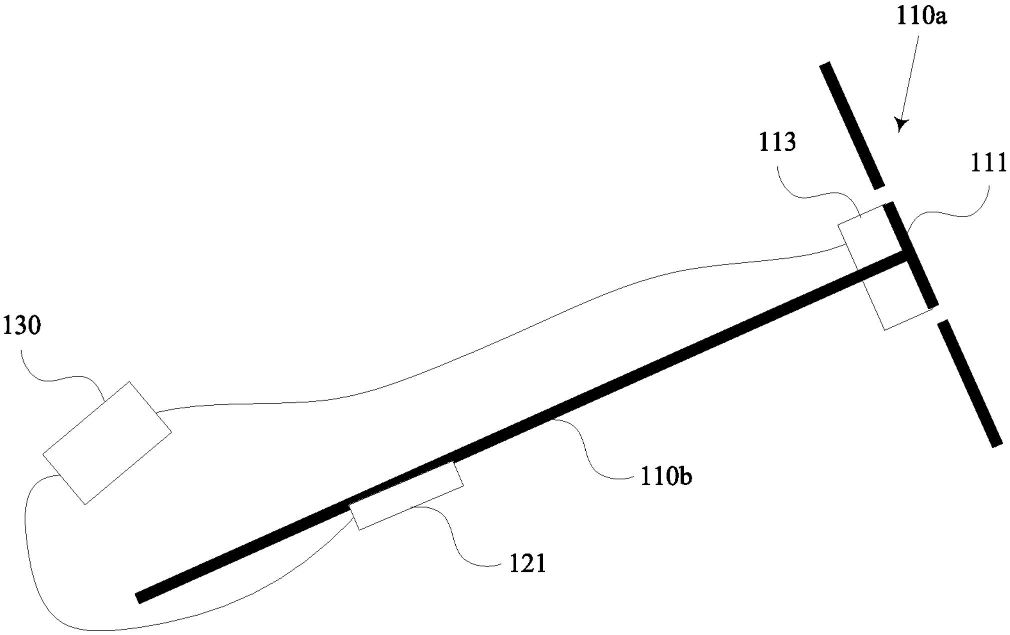
FIG. 5 is a schematic structural diagram of a retractable steering column according to an embodiment of the present invention.

FIG. 5 shows a structure of the retractable steering column 110*b* according to an embodiment. Referring to FIG. 5, in an embodiment, the retractable steering column 110*b* is connected to the body portion 111 of the collapsible steering wheel 110*a*. The interior assembly further includes an extending and retracting motor 121 for driving the steering column 110*b* to extend and retract, and the extending and retracting motor 121 is connected to the retractable steering column 110*b*, to drive the steering column 110*b* to retract and extend.

Figure 6:
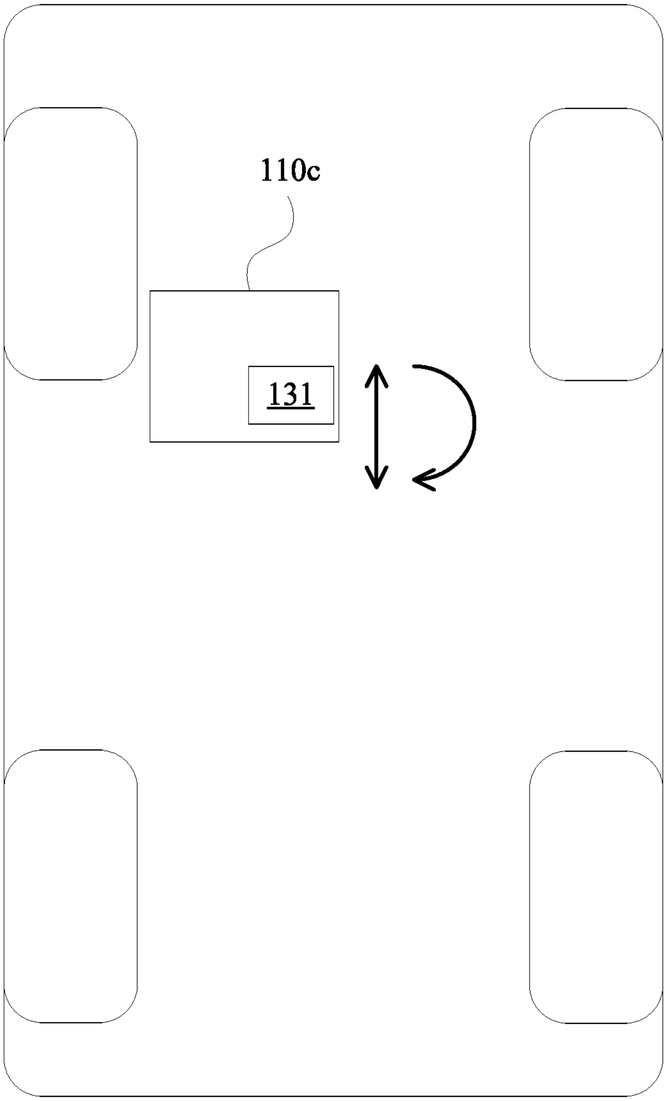
FIG. 6 is a schematic structural diagram of a movable seat according to an embodiment of the present invention.

FIG. 6 shows a structure of a movable seat 110*c* according to an embodiment. Referring to FIG. 6, in an embodiment, the movable seat 110*c* is mounted in a vehicle by means of a slide rail mechanism (not specifically shown in the figure). The interior assembly further includes a slide motor 131 for driving the seat 110*c* to move, and the slide motor 131 is connected to the slide rail mechanism, to drive the seat 110*c* to move along the slide rail mechanism. The seat 110*c* may be moved back and forth, or may rotate as required. The seat 110*c* is not limited to a driving seat, and further includes another occupant seat, which is not specifically shown in the figure.

In the in-service state, the interior assembly 110 can be manipulated normally by the driver. In the received state, the driver does not need to operate the interior assembly 110, and the cockpit space is increased, which is convenient for the driver to perform some non-driving operations such as entertainment and business.

In an embodiment, the flexible interior assembly 110 may have a plurality of received states. For example, the received state includes a first received state and a second received state, and a receiving travel for the first received state is greater than a receiving travel for the second received state. Therefore, in different travelling modes, the flexible interior assembly 110 may be received into different received states. For example, in the autonomous driving mode, the flexible interior assembly 110 may be received into the first received state, that is, a fully received state; and in an auto-hold mode, the flexible interior assembly 110 may be received into the second received state, that is, a semi-received state, to facilitate the restart of the vehicle.

The sensor assembly 120 may be an existing sensor in an automotive intelligent cockpit, such as a camera that monitors a state of an occupant. The detection range of the sensor assembly 120 covers the entire interior space of the vehicle, and can monitor the interior assembly 110 and an occupant in the vehicle.

The sensor assembly 120 may alternatively rotate, and when the interior assembly 110 switches motion between the in-service state and the received state, the sensor assembly 120 may rotate so that a working surface of the sensor assembly faces the interior assembly 110, to monitor the motion of the interior assembly 110 in real time; and when the interior assembly 110 is in the in-service state or the received state, the sensor assembly 120 may rotate so that a working surface of the sensor assembly faces another monitored object, for example, to monitor an occupant, so that time division multiplexing of the sensor assembly 120 is implemented, an integration level of the vehicle interior system is improved, and a structural design is simplified.

The sensor assembly 120 may specifically include at least one time-of-flight (TOF) camera arranged in the vehicle, and the TOF camera has the ability to obtain three-dimensional space data in the vehicle, and can instantly reconstruct an in-vehicle space model and an occupant model by obtaining depth information, to implement accurate detection.

The electronic control unit (ECU) 130 is connected to a driving motor of the interior assembly. Specifically, referring to FIG. 5, the electronic control unit 130 is connected to each of the collapsing motor 113 for driving the collapsible steering wheel 110*a* to collapse, the extending and retracting motor 121 for driving the retractable steering column 110*b* to extend and retract, and the slide motor (not shown) for driving the movable seat to move, to adjust the motion of the interior assembly based on data detected by the sensor assembly.

The present invention further provides a vehicle, and the vehicle is equipped with the vehicle interior system according to any one of the foregoing embodiments. The vehicle is an autonomous vehicle, and during travelling of the autonomous vehicle, a trigger button for the received state is turned on only in an autonomous driving mode. For example, referring to FIG. 2, a trigger button 31 for the received state and a trigger button 32 for the in-service state are arranged on the collapsible steering wheel 110*a*, to facilitate the manipulation of the driver. The electronic control unit may automatically control the motion of the interior assembly based on the travelling mode, and the driver may also trigger the motion of the interior assembly as required. During travelling of the vehicle, the trigger button 31 for the received state is turned on only in the autonomous driving mode, to ensure travelling safety and avoid improper collapsing of the interior assembly caused by improper operation of the driver. The trigger button 32 for the in-service state is turned on in any travelling mode, and the driver can take over the vehicle at any time as required. Certainly, in a non-driving process that does not require the driver to control the interior assembly, such as in a parking mode, the trigger button 31 for the received state can also be turned on.

In conclusion, the vehicle interior system and the vehicle in the present invention are integrated with a flexible interior assembly such as the collapsible steering wheel, the retractable steering column, and the movable seat, which can improve an integration level and functionality of the vehicle interior system, and can simplify a structure of the vehicle interior system; the flexible interior assembly has the in-service state and the received state, and can switch motion between the in-service state and the received state; and the interior assembly is detected by the sensor assembly and is controlled by the electronic control unit, so that the sensor assembly can be used to monitor motion of the interior assembly in real time, and the electronic control unit can be used to adjust the motion of the interior assembly in time, to ensure that the interior assembly moves stably and accurately. During movement of the interior assembly, when the interior assembly is interfered with by a foreign object, response can be made in time to avoid damage to the interior assembly, prevent an occupant from being injured, and improve user experience.

The present invention further includes a control method for a vehicle interior system, and the method is used to control an interior assembly in a vehicle to move between an in-service state and a received state. The interior assembly referred to in the present invention is a flexible interior assembly, which may specifically include a collapsible steering wheel, a retractable steering column, and a movable seat. The interior assembly is connected to a sensor assembly and an electronic control unit of the vehicle, and can move stably and accurately under monitoring of the sensor assembly and under control of the electronic control unit.

In the in-service state, the interior assembly can be manipulated normally by the driver. In the received state, the driver does not need to operate the interior assembly, and the cockpit space is increased, which is convenient for the driver to perform some non-driving operations such as entertainment and business.

The collapsible steering wheel may specifically include a body portion and a collapsing portion, and the collapsing portion is connected to the body portion by means of a collapsing connector; and the interior assembly may further include a collapsing motor for driving the steering wheel to collapse, and the collapsing motor is connected to the collapsing connector. The collapsing connector may be specifically composed of a hinge, or may be another collapsible structural component. The steering wheel may be further provided with a hands-off detection apparatus to detect whether the hands of the driver accurately control the steering wheel in a driver manipulation mode.

The retractable steering column is connected to the body portion of the collapsible steering wheel. The interior assembly further includes an extending and retracting motor for driving the steering column to extend and retract, and the extending and retracting motor is connected to the steering column.

The movable seat is mounted in a vehicle by means of a slide rail mechanism; and the interior assembly further includes a slide motor for driving the seat to move, and the slide motor is connected to the slide rail mechanism. The seat may be moved back and forth, or may rotate as required. The seat is not limited to a driving seat, and further includes another occupant seat.

The sensor assembly may be an existing sensor in an automotive intelligent cockpit, such as a camera that monitors a state of an occupant. When the interior assembly switches motion between the states, the sensor assembly may rotate so that a working surface of the sensor assembly faces the interior assembly, to monitor the motion of the interior assembly in real time to adjust the motion of the interior assembly in the actual scenario. When the interior assembly is interfered with by a foreign object, the sensor assembly can respond in time to ensure stable and accurate motion of the interior assembly, avoid damage due to the interference, and prevent an occupant from being injured. In addition, when the interior assembly is in the in-service state or the received state, the sensor assembly may rotate so that a working surface of the sensor assembly faces another monitored object, for example, to monitor an occupant, so that time division multiplexing of the sensor assembly is implemented, an integration level of the interior is improved, and a structural design is simplified.

The sensor assembly may specifically include at least one time-of-flight (TOF) camera arranged in the vehicle, and the TOF camera has the ability to obtain three-dimensional space data in the vehicle, and can instantly reconstruct an in-vehicle space model and an occupant model by obtaining depth information, to implement accurate detection.

The electronic control unit (ECU) is connected to a driving motor of the interior assembly, specifically including the collapsing motor for driving the steering wheel to collapse, the extending and retracting motor for driving the steering column to extend and retract, and the slide motor for driving the seat to move, to adjust the motion of the interior assembly in real time based on data detected by the sensor assembly.

In an embodiment, the interior assembly may have a plurality of received states. For example, the received state includes a first received state and a second received state, and a receiving travel for the first received state is greater than a receiving travel for the second received state. Therefore, in different travelling modes, the interior assembly may be controlled to be received into different received states. For example, in the autonomous driving mode, the interior assembly is controlled to be received into the first received state, that is, a fully received state; and in an auto-hold mode, the interior assembly is controlled to be received into the second received state, that is, a semi-received state, to facilitate the restart of the vehicle.

In the present invention, the vehicle equipped with the foregoing flexible interior assembly is specifically an autonomous vehicle. A trigger button for the received state and a trigger button for the in-service state may be arranged on the steering wheel of the autonomous vehicle, to facilitate the manipulation of the interior assembly by the driver. The electronic control unit may automatically control the motion of the interior assembly based on the travelling mode, and the driver may also trigger the motion of the interior assembly as required. During travelling of the vehicle, the trigger button for the received state is turned on only in the autonomous driving mode, to ensure travelling safety and avoid improper collapsing of the interior assembly caused by improper operation of the driver. The trigger button for the in-service state is turned on in any travelling mode, and the driver can take over the vehicle at any time as required. Certainly, in a non-driving process that does not require the driver to control the interior assembly, such as in a parking mode, the trigger button for the received state can also be turned on.

In some embodiments, the control method for a vehicle interior system according to the present invention may be used to control a vehicle interior system (for example, the vehicle interior system shown in FIGS. 1 to 6) described in any one of the foregoing embodiments.

The following describes in detail the control method for a vehicle interior system. The control method for a vehicle interior system according to the present invention is specifically performed by an electronic control unit of a vehicle.

Figure 7:
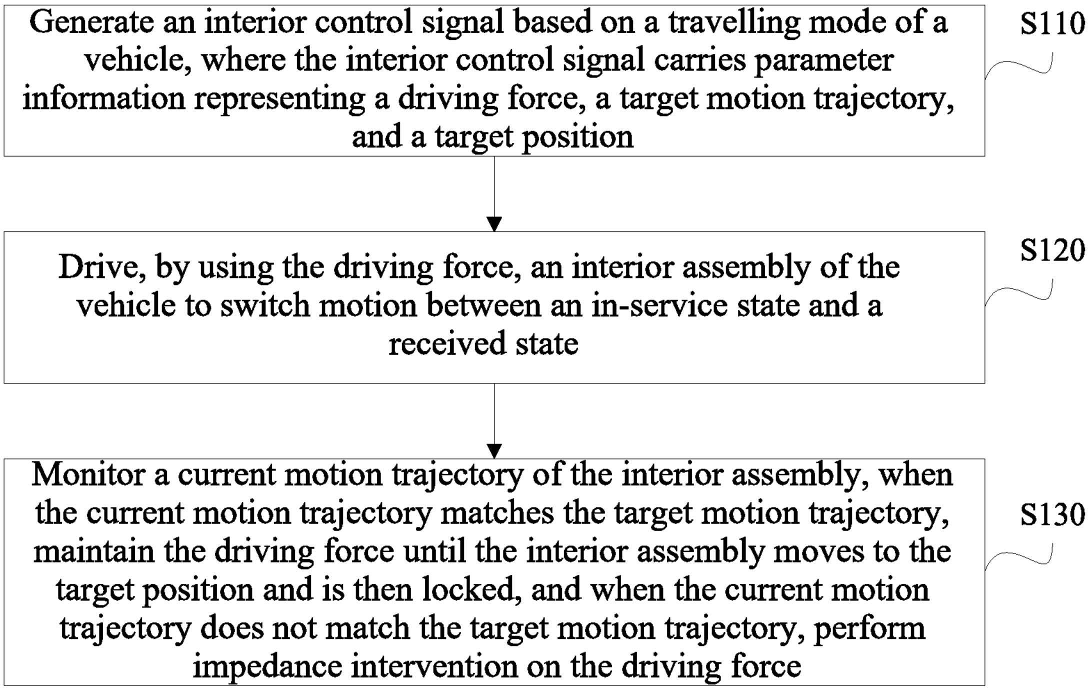
FIG. 7 is a schematic diagram of steps of a control method for a vehicle interior system according to an embodiment of the present invention.

FIG. 7 shows main steps of a control method for a vehicle interior system according to an embodiment. Referring to FIG. 7, the control method includes: step S110, generating an interior control signal based on a travelling mode of a vehicle, where the interior control signal carries parameter information representing a driving force, a target motion trajectory, and a target position; step S120, driving, by using the driving force, an interior assembly of the vehicle to switch motion between the in-service state and the received state; and step S130, monitoring a current motion trajectory of the interior assembly, when the current motion trajectory matches the target motion trajectory, maintaining the driving force until the interior assembly moves to the target position and is then locked, and when the current motion trajectory does not match the target motion trajectory, performing impedance intervention on the driving force.

The driving force is used to control a force transmitted by an electronic control unit to a driving motor of the interior assembly and used to drive the interior assembly to move. The driving force may be a force preset by a system and capable of ensuring the interior assembly to move stably. In some embodiments, alternatively, a predetermined driving force mode is preset in the system of the vehicle, when the current motion trajectory matches the target motion trajectory, the predetermined driving force mode can be maintained until the interior assembly moves to the target position and is then locked. In the predetermined driving force mode, the driving force may be unchanged, or may change based on a preset mode to ensure the interior assembly to move stably.

The target motion trajectory may be set to target momentum every a preset period of time, for example, target momentum every 50 ms. The target position is a final locking position of the interior assembly. In the received state, the target position is a final deployment position; and in the in-service state, the target position is a final received position.

The current motion trajectory of the interior assembly may be monitored with reference to a sensor assembly. The sensor assembly acquires movement data of the interior assembly in real time and provides the movement data for the electronic control unit, and the electronic control unit determines whether the current motion trajectory of the interior assembly matches the target motion trajectory. For example, the electronic control unit determines, once every 50 ms, whether current momentum of the interior assembly is equal to target momentum at a current moment, and if yes, determines the current motion trajectory of the interior assembly matches the target motion trajectory, otherwise, determines that the current motion trajectory of the interior assembly does not match the target motion trajectory.

When the current motion trajectory of the interior assembly matches the target motion trajectory, the driving force is maintained based on the preset predetermined driving force mode such that the interior assembly moves to the target position along the target motion trajectory and is then locked. It should be noted that, when the interior assembly includes a plurality of components, the interior control signal includes a plurality of signals respectively corresponding to the components, and switchover and movement between states of the components may be performed at different times or synchronously depending on a structural relationship between the components. For example, the interior assembly includes a steering wheel, a steering column, and a seat, and then the interior control signal carries parameter information separately represents a driving force of the steering wheel, the steering column, and the seat, a target motion trajectory, and a target position. The interior control signal includes an interior in-service signal and an interior receiving signal. In the case of the interior in-service signal, deployment of the steering wheel needs to performed after the steering column is completely extended, and movement of the seat and movement of the steering wheel/steering column may be performed synchronously; and in the case of the interior receiving signal, retraction of the steering column needs to performed after the steering wheel is completely collapsed, and movement of the seat and motion of the steering wheel/steering column may be performed synchronously. Certainly, if extending and retracting of the steering column do not interfere with the movement of the steering wheel, movement of the steering wheel and movement of the steering column may also be performed synchronously.

When the current motion trajectory of the interior assembly does not match the target motion trajectory, including the movement of the interior assembly lagging and preceding, the electronic control unit needs to perform impedance intervention on the driving force to avoid damage to the interior assembly or injury to an occupant. The current motion trajectory of the interior assembly is monitored in real time, so that when the current motion trajectory of the interior assembly does not match the target motion trajectory, adjustment can be made in time so that the interior assembly moves stably and accurately to the target position. The travelling mode of the vehicle may be determined by the electronic control unit based on travelling data acquired by a plurality of sensors, and may be determined by using an existing technology, which is not limited in the present invention.

Figure 8:
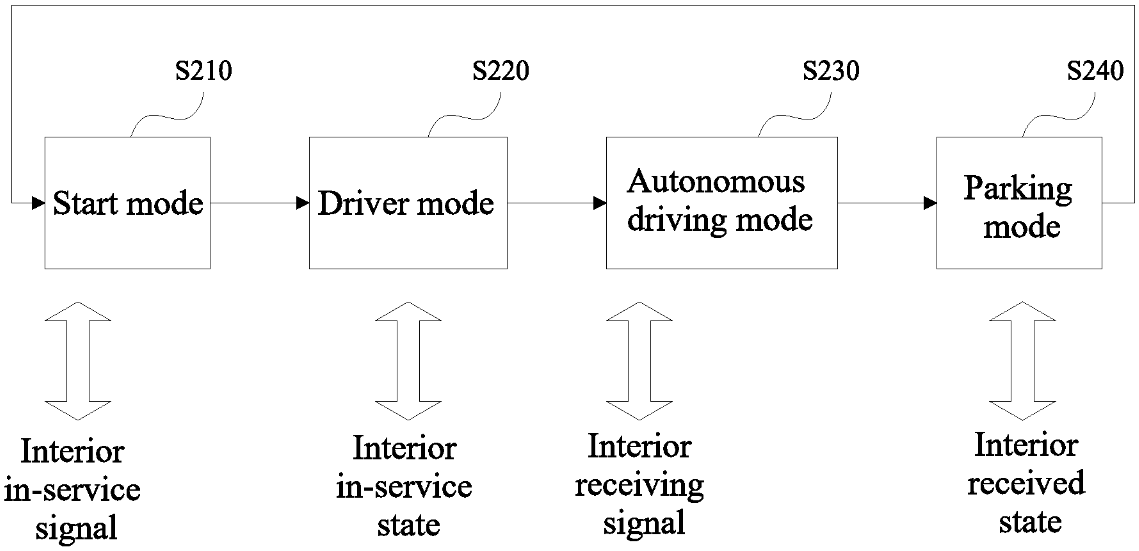
FIG. 8 is a schematic diagram of interior control in different travelling modes according to an embodiment of the present invention.

FIG. 8 schematically shows interior control in different travelling modes. Referring to FIG. 8, the travelling mode of the vehicle includes, for example, from the start to the stop of the vehicle: a start mode S210, a driver mode S220, an autonomous driving mode S230, and a parking mode S240. Before the parking mode S240, depending on the configuration of different autonomous driving levels, the driver may be required for manipulation, which is not shown in the figure. The interior control signal includes an interior in-service signal and an interior receiving signal; in the start mode, the interior in-service signal is generated; in the driver mode, an interior in-service state is maintained; in the autonomous driving mode, the interior receiving signal is generated; and in the parking mode and after the stop, an interior received state is maintained. Certainly, referring to the foregoing embodiment, received states of the interior assembly in the autonomous driving mode S230 and the parking mode S240 may be different, and the description will not be repeated here. In the interior received state, if the electronic control unit determines that the driver is required to take over the vehicle, the interior in-service signal is generated in time, to ensure that the interior is fully deployed before the driver officially takes over the vehicle.

Figure 9:
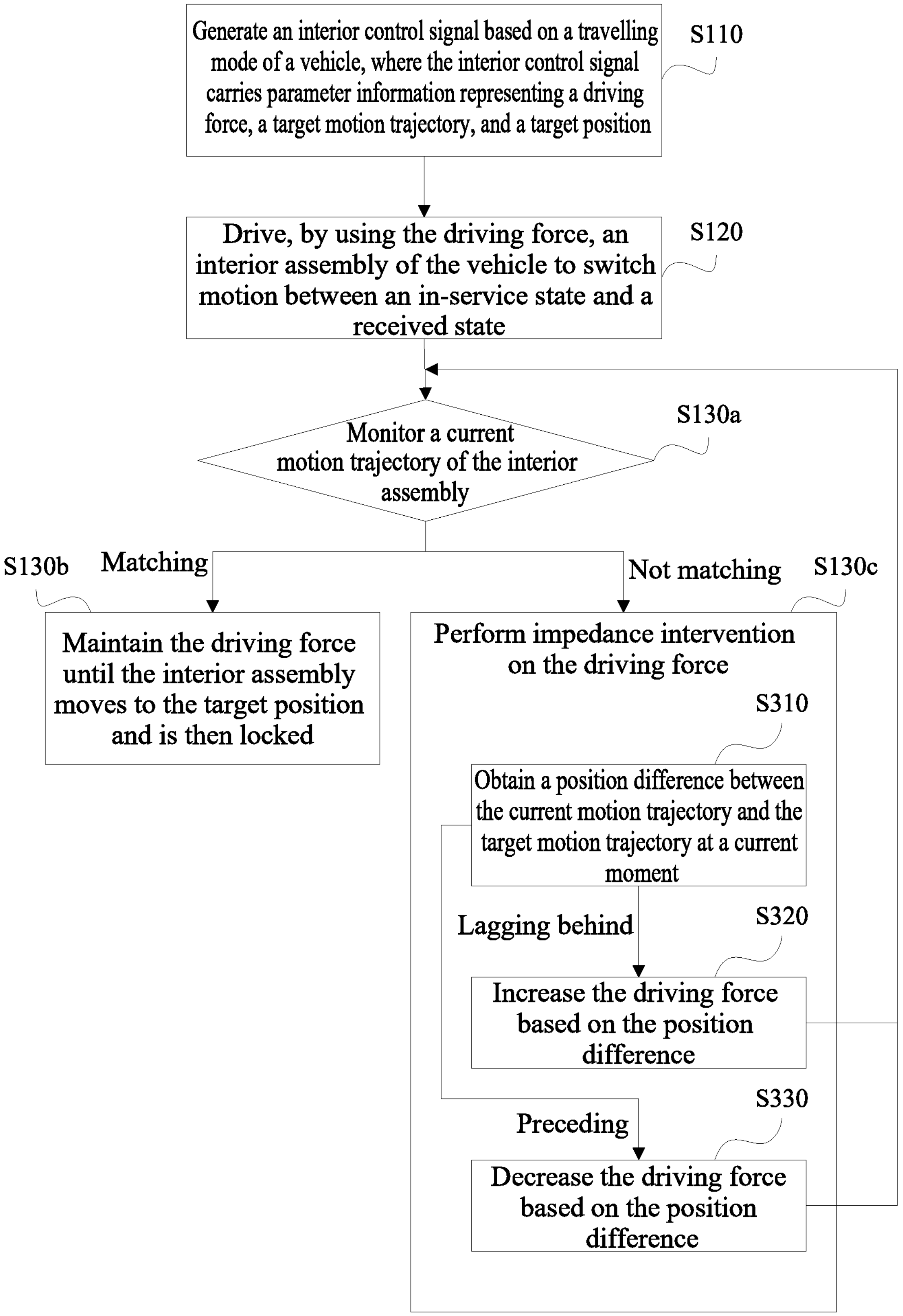
FIG. 9 is a schematic diagram of steps of performing impedance intervention on a driving force according to an embodiment of the present invention.

FIG. 9 shows steps of performing impedance intervention on a driving force according to an embodiment. Referring to FIG. 9, in this embodiment, step S130*a* is used to monitor a current motion trajectory of the interior assembly, when the current motion trajectory matches the target motion trajectory, step S130*b* is used to maintain the driving force until the interior assembly moves to the target position and is then locked, and when the current motion trajectory does not match the target motion trajectory, step S130*c* is used to perform impedance intervention on the driving force. Step S130*c* specifically includes: S310, obtaining a position difference between the current motion trajectory and the target motion trajectory at a current moment; S320, when the current motion trajectory lags behind the target motion trajectory, increasing the driving force based on the position difference, and returning to step S130*a* to monitor the current motion trajectory of the interior assembly; and S330, when the current motion trajectory precedes the target motion trajectory, decreasing the driving force based on the position difference, and returning to step S130*a* to monitor the current motion trajectory of the interior assembly.

Based on current momentum of the interior assembly at a current moment and target momentum corresponding to the current moment, a distance deviation between the current motion trajectory and the target motion trajectory in a forward direction of the interior assembly, that is, the position difference, can be obtained. If the current motion trajectory lags behind the target motion trajectory, it indicates that the interior assembly may be blocked, and therefore, the driving force is increased based on the position difference to accelerate the movement of the interior assembly; if the current motion trajectory precedes the target motion trajectory, it indicates that the interior assembly may be manually pulled, and therefore, the driving force is decreased based on the position difference to decelerate the movement of the interior assembly.

The driving force may be specifically adjusted based on the position difference, a mass of the interior assembly, an interference force acting on the interior assembly, and an internal impedance of the interior assembly; and the mass and the internal impedance of the interior assembly are each set values, and the interference force acting on the interior assembly may be detected by a related mechanical sensor. The driving force is in direct proportion to each of the position difference, the mass of the interior assembly, the interference force acting on the interior assembly, and the internal impedance of the interior assembly. A specific calculation manner of the driving force may be an existing mechanical calculation manner, which is not limited in the present invention.

Figure 10:
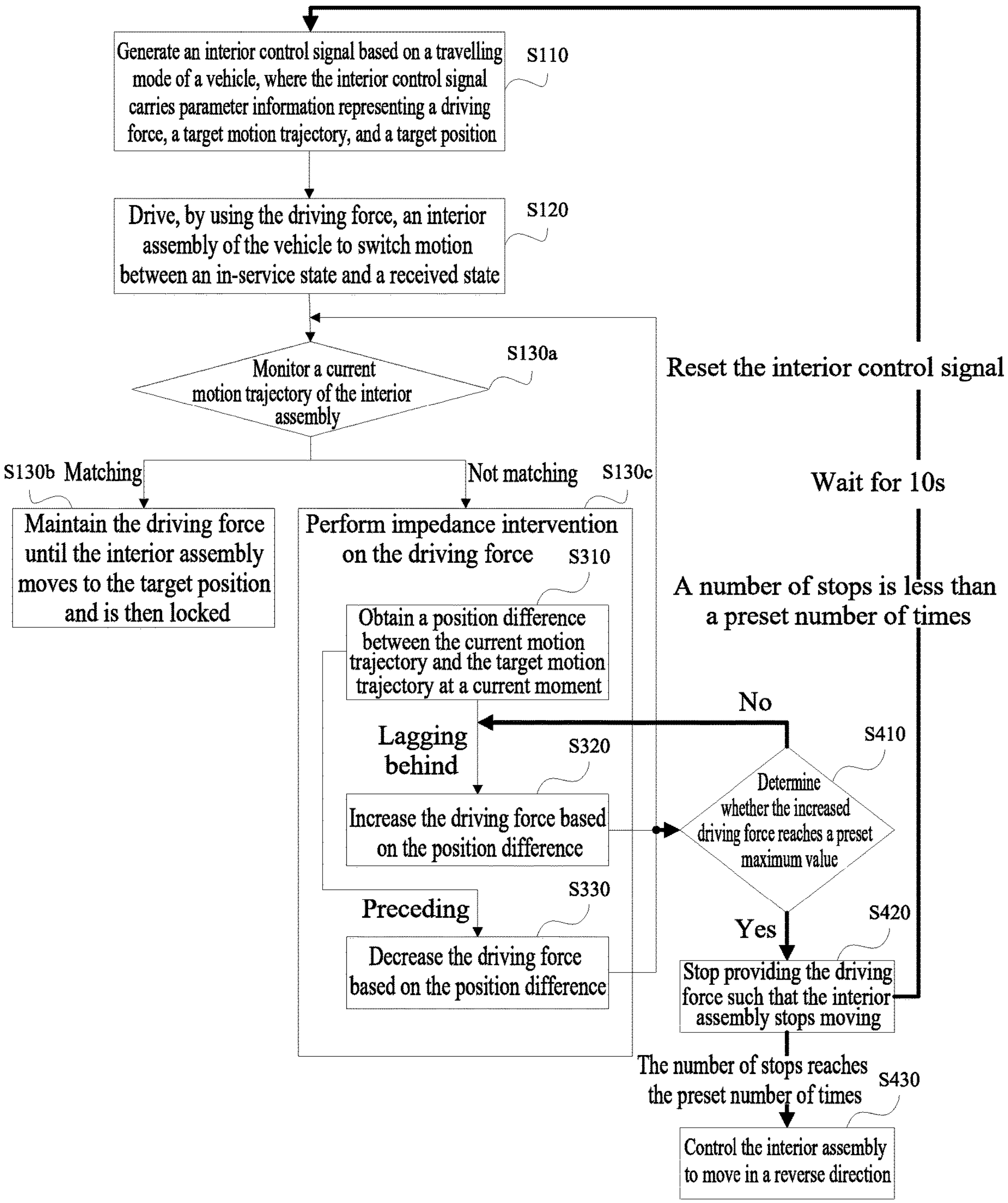
FIG. 10 is a schematic diagram of control when a target motion trajectory is still not reached after a driving force is increased according to an embodiment of the present invention.

FIG. 10 shows a control process when a target motion trajectory is still not reached after a driving force is increased according to an embodiment. After the driving force is increased, the method returns to detecting whether the current motion trajectory of the interior assembly matches the target motion trajectory, and when it is detected that the current motion trajectory does not match the target motion trajectory, with reference to bold arrows in FIG. 10, the control method further includes the following steps: Step S410, whether the increased driving force reaches a preset maximum value is determined. If the driving force has reached the maximum value, step S420 is performed to stop providing the driving force such that the interior assembly stops moving, and record a number of stops. Stopping providing the driving force means that the driving force changes to zero, and the interior assembly may continue to move for a short distance under the effect of inertia and then stop after the providing of the driving force is stopped. Stopping providing the driving force may avoid causing danger. For example, a human body part of an occupant may block the motion of the interior assembly in this case. If the driving force is continuously increased, the interior assembly may be damaged, and the occupant may also be injured. When the recorded number of stops is less than the preset number of times, it takes a preset period of time to wait for, such as 10 s, and during the waiting process, an occupant may be prompted to avoid it by means of voice/display screen, etc., and then the process returns to resetting the interior control signal; and When the number of stops reaches the preset number of times, for example, in the case of a second stop, a corresponding occupant may not want the interior assembly to change states, or there is an unavoidable obstacle in a forward direction of the interior assembly, and then step S430 is performed to control the interior assembly to move in a reverse direction. If the driving force does not reach the maximum value, the driving force is increased, and the process returns to monitoring the motion of the interior assembly.

Figure 11:
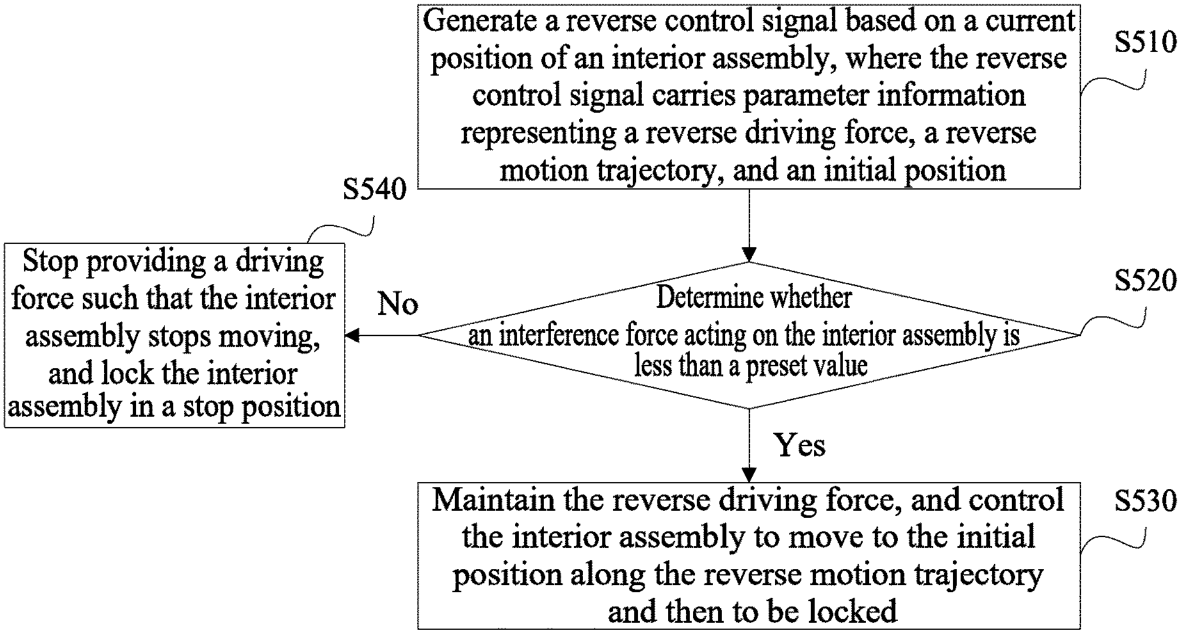
FIG. 11 is a schematic diagram of steps of controlling an interior assembly to move in a reverse direction according to an embodiment of the present invention.

FIG. 11 shows a process of controlling an interior assembly to move in a reverse direction according to an embodiment. With reference to FIG. 11, controlling, when the number of stops reaches the preset number of times, the interior assembly to move in a reverse direction includes: step S510, generating a reverse control signal based on a current position of the interior assembly, where the reverse control signal carries parameter information representing a reverse driving force, a reverse motion trajectory, and an initial position; step S520, determining whether an interference force acting on the interior assembly is less than a preset value; if the interference force is less than the preset value, performing step S530 to maintain the reverse driving force, and control the interior assembly to move to the initial position along the reverse motion trajectory and then to be locked; and if the interference force is not less than the preset value, performing step S540 to stop providing the driving force such that the interior assembly stops moving, and lock the interior assembly in a stop position of the interior assembly.

The interference force refers to a force used by a foreign object, that is, an obstacle (including a human body and an object), to act on the interior assembly. When it is determined that the interference force acting on the interior assembly is less than a preset value, a reverse driving force may be further maintained in a preset reverse driving force mode. In the preset reverse driving force mode, the reverse driving force may be unchanged, or may change based on a preset mode to ensure the interior assembly to move stably.

Based on a type and position of the obstacle, the reverse control signal can be adjusted appropriately based on the interior control signal. Specifically, when the current motion trajectory lags behind the target motion trajectory, the sensor assembly may be used to detect the type and position of the obstacle acting on the interior assembly, so that based on the type and position of the obstacle, the electronic control unit determines the value of the preset maximum value when the driving force is increased, and a relationship between the motion speed of the reverse motion trajectory and the motion speed of the target motion trajectory.

The type of the obstacle includes a human body and an object, and the position thereof includes a clamping position and a blocking position. In a human body clamping mode, the motion speed of the reverse motion trajectory is controlled to be greater than the motion speed of the target motion trajectory, to quickly resume the initial position of the interior assembly, and prevent the human body from being injured; and in another obstacle mode, including an object clamping mode, a human body blocking mode, and an object blocking mode, the motion speed of the reverse motion trajectory may be slightly less than the motion speed of the target motion trajectory, to control the interior assembly to stably resume an initial state of the interior assembly.

A scenario corresponding to the human body clamping mode is, for example, a finger of the driver being clamped by the interior assembly; a scenario corresponding to the object clamping mode is, for example, a work badge hanging on the driver's chest being clamped by the interior assembly; a scenario corresponding to the human body blocking mode is, for example, the driver pushing the interior assembly with palms, blocking the normal movement of the interior assembly; and a scenario corresponding to the object blocking mode is, for example, the interior assembly being blocked by sunshade components in the vehicle. Certainly, the human body clamping mode, the object clamping mode, the human body blocking mode, and the object blocking mode further include other scenarios, which will not be enumerated here again.

The value of the maximum value of the driving force when the obstacle is a human body is less than the value of the maximum value of the driving force when the obstacle is an object, to prevent the human body from being injured by an excessive increase of the driving force. Specifically, in the human body clamping mode, the maximum value of the driving force is set to Fmax=F1; in the object clamping mode, the maximum value of the driving force is set to Fmax=F2; in the human body blocking mode, the maximum value of the driving force is set to Fmax=F3; in the object blocking mode, the maximum value of the driving force is set to Fmax=F4; F1<F2<F3<F4. As such, it not only avoids injury to the human body, but also avoids system damage caused by returning to the interior assembly too quickly in the clamping mode.

After the interior assembly is locked in the stop position, retraction/deployment of the interior assembly can be continued based on triggering of related trigger buttons.

Figure 12:
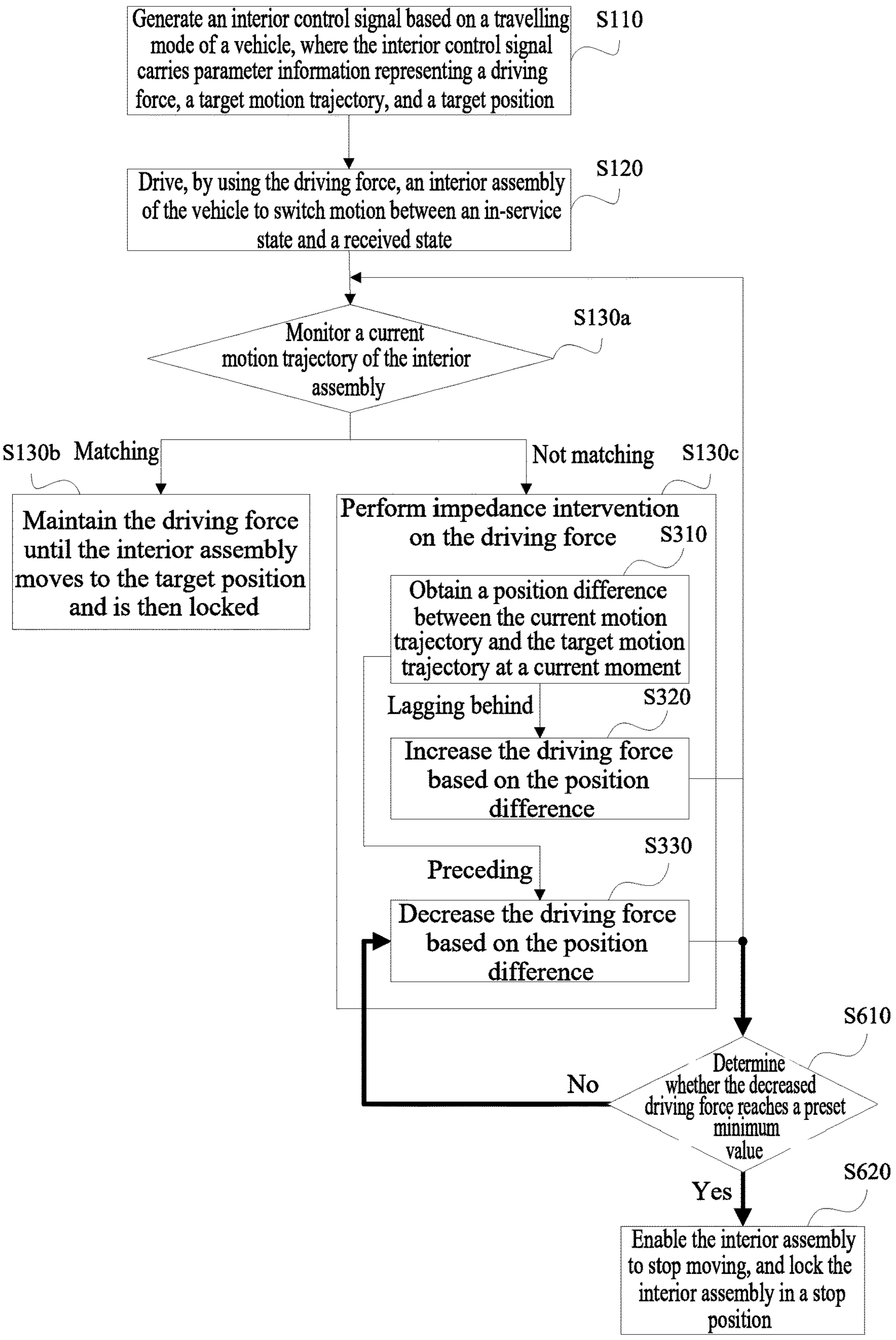
FIG. 12 is a schematic diagram of control when a target motion trajectory is still not reached after a driving force is decreased according to an embodiment of the present invention.

FIG. 12 shows a control process of decreasing a driving force when the current motion trajectory precedes the target motion trajectory according to an embodiment. After the driving force is decreased, the method returns to detecting whether the current motion trajectory of the interior assembly matches the target motion trajectory, and when it is detected that the current motion trajectory precedes the target motion trajectory, with reference to bold arrows in FIG. 12, the control method further includes the following steps: Step S610, whether the decreased driving force reaches a preset minimum value is determined, where the minimum value is a force value greater than zero but less than an initial preset value of the driving force. If the interference force is less than the preset value, step S620 is performed to stop providing the driving force such that the interior assembly stops moving, and lock the interior assembly in a stop position of the interior assembly, and by setting the minimum value of the driving force, an interference force applied by an foreign object on the interior assembly can be indirectly limited, that is, a degree to which the interference force affects the movement of the interior assembly can be limited, and the interior assembly can be prevented from being damaged due to movement under an excessive interference force; and if the interference force is not less than the preset value, the process returns to decreasing the driving force, and continuously monitor the motion of the interior assembly, until the interior assembly moves to the target position. For example, an occupant applies a force in the same direction as the movement of the interior assembly to accelerate the movement of the interior assembly. In this case, based on a force required for the movement of the interior assembly, combined with the already applied interference force, the driving force of the system is decreased, so that the motion speed of the interior assembly returns to normal. If the interior assembly is still accelerating and the driving force has been decreased to a minimum, an emergency stop is performed on the interior assembly to avoid system damage.

By using the foregoing control method for a vehicle interior system, the movement of the interior assembly can be adjusted in real time in the actual scenario to ensure that the interior assembly moves stably and accurately; and when the interior assembly is interfered with by a foreign object, response can be made in time to avoid damage to the interior assembly, prevent an occupant from being injured, and improve user experience.

Figure 13:
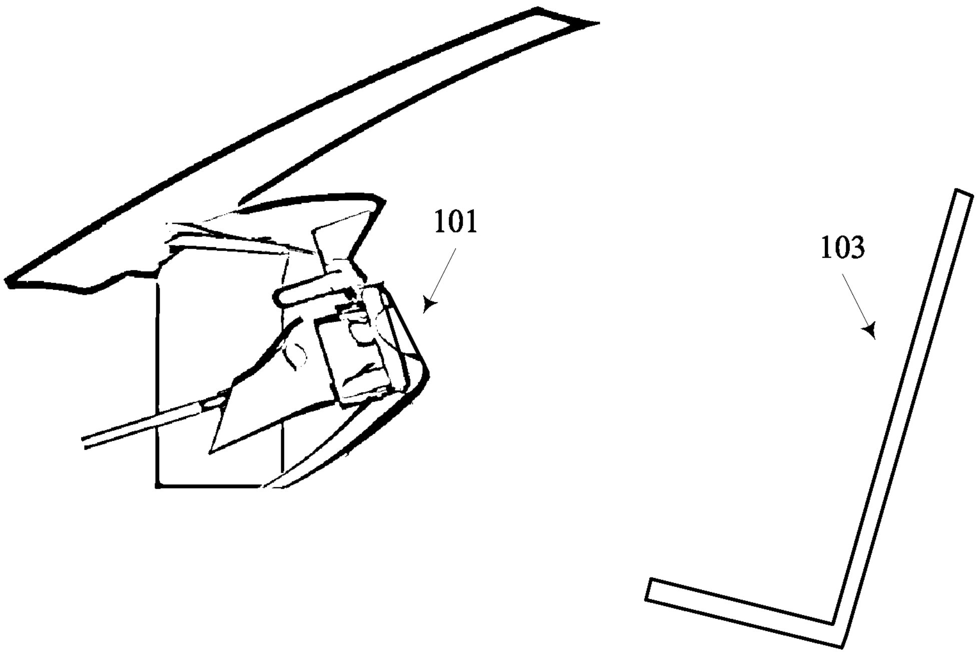
FIG. 13 is a schematic diagram of a state of an interior assembly before a vehicle is started according to an embodiment of the present invention.
Figure 14:
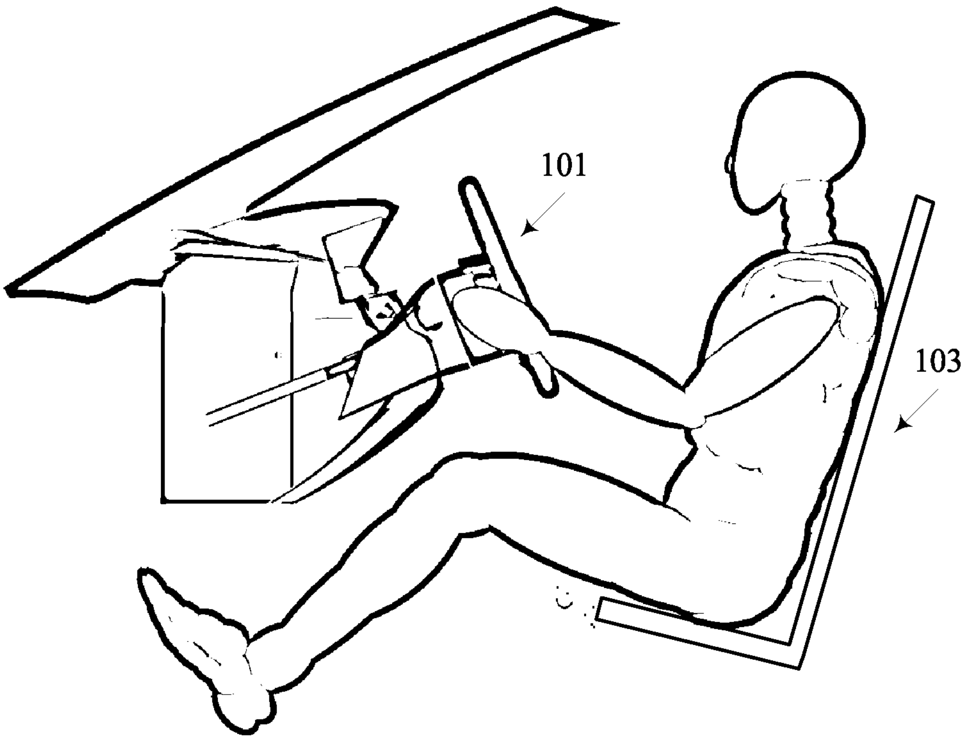
FIG. 14 is a schematic diagram of a state of an interior assembly after a vehicle is started according to an embodiment of the present invention.

Further, in an embodiment, with reference to a state of the interior assembly before the vehicle is started as shown in FIG. 13 and a state of the interior assembly after the vehicle is started as shown in FIG. 14, the interior assembly includes a flexible steering assembly 101 and a movable driving seat 103, and in the start mode, the control method further includes: detecting a seat belt of the driving seat 103 and a seated pressure; and when a seat belt fastened signal of the driving seat 103 is detected, generating a first interior in-service signal that controls the steering assembly 101, and generating, based on a preset mapping relationship between the seated pressure and a motion distance of the driving seat 103, a second interior in-service signal that controls the driving seat 103. As such, in the state before the start as shown in FIG. 13, the driving seat 103 is far away from the steering assembly 101 in this case, which can facilitate getting on and off the vehicle; when the driver is seated and fastens a seat belt, the system triggers the steering assembly 101 to automatically deploy, to ensure travelling safety; and a body shape of the driver is estimated based on the seated pressure, and the driving seat 103 is properly adjusted. The adjusted state is shown in FIG. 14, the steering assembly 101 is fully deployed, and the driving seat 103 is moved to an appropriate position without a need for further manual adjustment of the driver. The mapping relationship between the seated pressure and the motion distance of the driving seat 103 may be prestored in the system, to properly adjust the driving seat 103 based on different seated pressure intervals.

In an embodiment, in the autonomous driving mode, the control method further includes: detecting a travelling control signal of the vehicle; when an emergency braking signal is detected, generating an emergency deployment signal that controls the steering assembly, where an emergency deployment speed corresponding to the emergency deployment signal is greater than a motion speed corresponding to the first interior in-service signal, and a locked position of the emergency deployment signal is beyond a target position of the first interior in-service signal; and controlling, based on the emergency deployment signal, the steering assembly to perform emergency deployment to the locked position, and controlling an airbag on the steering assembly to be ejected during the emergency deployment. The travelling control signal is generated by the electronic control unit based on preset autonomous driving control logic, which is not limited in the present invention. In the autonomous driving mode, when a vehicle condition requiring emergency braking is detected and there is no time to wait for the driver to take over, the electronic control unit may generate an emergency braking signal. However, in this case, the steering assembly is in the received state, a distance from the driver is relatively far, and the driver is in a relaxed state without driving and manipulation. It is very likely that sudden emergency braking of the vehicle slams into the front, resulting in a collision injury or a body portion stretch injury. Therefore, the electronic control unit immediately generates an emergency deployment signal for controlling the steering assembly, so that the steering assembly in the received state is deployed at a faster emergency deployment speed than normal deployment to a locked position that is farther and closer to the driver's position than normal deployment, and the airbag is ejected during the emergency deployment process, to implement the safety protection of the driver in the emergency braking scenario during the autonomous driving process through the airbag close to the driver.

An embodiment of the present invention further provides a control apparatus for a vehicle interior system, and the control apparatus may be configured to implement the control method for a vehicle interior system according to any one of the foregoing embodiments. Features and principles of the control method for a vehicle interior system according to any one of the foregoing embodiments are both applicable to the following embodiment of a control apparatus for a vehicle interior system. In the following embodiment of the control apparatus for a vehicle interior system, the control features and principles of the vehicle interior system that have been illustrated will not be repeatedly described.

Figure 15:
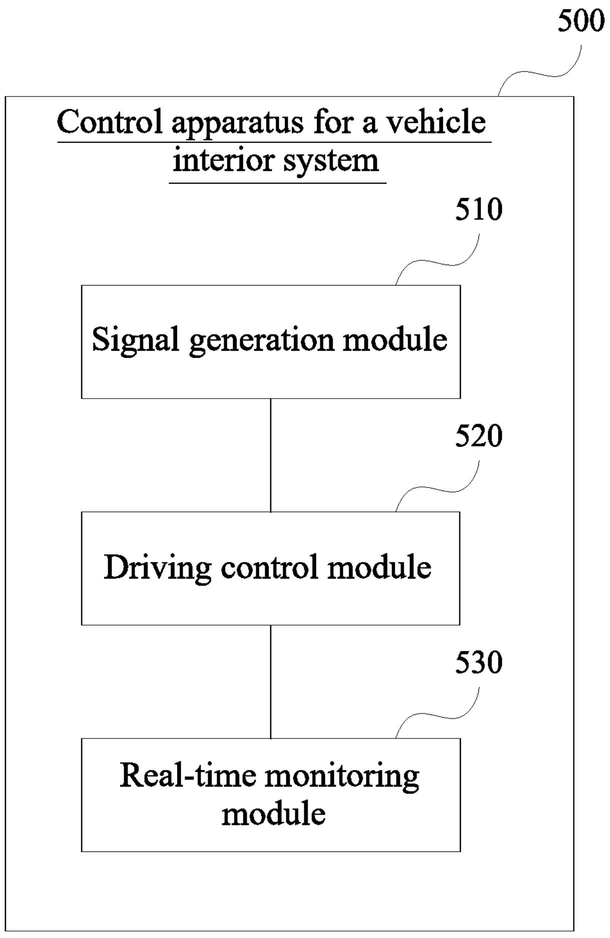
FIG. 15 is a schematic diagram of modules of a control apparatus for a vehicle interior system according to an embodiment of the present invention.

FIG. 15 shows main modules of a control apparatus for a vehicle interior system according to an embodiment. Referring to FIG. 15, the control apparatus 500 for a vehicle interior system in this embodiment includes: a signal generation module 510 configured to generate an interior control signal based on a travelling mode of a vehicle, where the interior control signal carries parameter information representing a driving force, a target motion trajectory, and a target position; a driving control module 520 configured to drive, by using the driving force, an interior assembly of the vehicle to switch motion between the in-service state and the received state; and a real-time monitoring module 530 configured to monitor a current motion trajectory of the interior assembly, so that when the current motion trajectory matches the target motion trajectory, the driving control module maintains the driving force until the interior assembly moves to the target position and is then locked, and when the current motion trajectory does not match the target motion trajectory, performs impedance intervention on the driving force.

Further, the control apparatus 500 for a vehicle interior system may further include modules that implement other process steps in the foregoing embodiments of the control method for a vehicle interior system, and for the specific principles of each module, reference can be made to the description of the foregoing embodiments of the control method for a vehicle interior system, which will not be repeated here.

As described above, by using the foregoing control apparatus for a vehicle interior system in the present invention, the movement of the interior assembly can be adjusted in real time in above, according to the disclosure ensure that the interior assembly moves stably and accurately; and when the interior assembly is interfered with by a foreign object, response can be made in time to avoid damage to the interior assembly, prevent an occupant from being injured, and improve user experience.

An embodiment of the present invention further provides an electronic device, including a processor; and a memory storing executable instructions, where when the executable instructions are executed by the processor, the control method for a vehicle interior system according to any one of the foregoing embodiments is implemented.

As described above, by using the electronic device in the present invention, the movement of the interior assembly can be adjusted in real time in above, according to the disclosure ensure that the interior assembly moves stably and accurately; and when the interior assembly is interfered with by a foreign object, response can be made in time to avoid damage to the interior assembly, prevent an occupant from being injured, and improve user experience.

Figure 16:
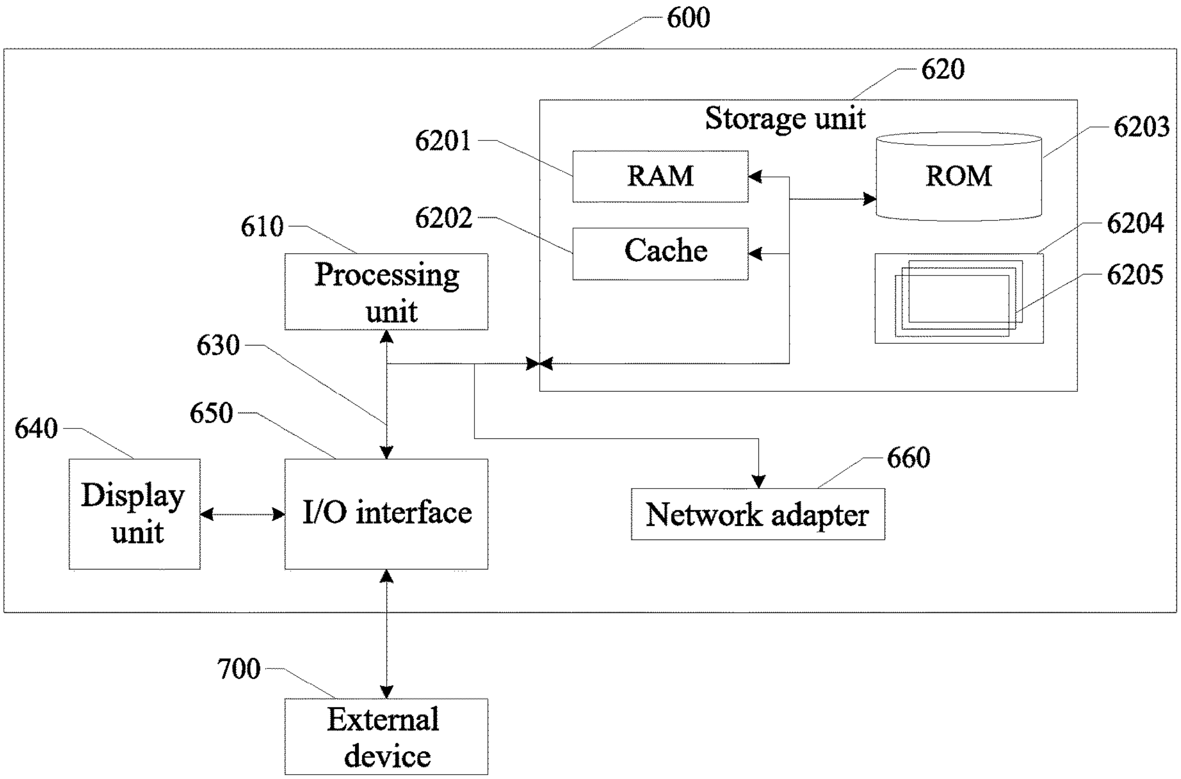
FIG. 16 is a schematic structural diagram of an electronic device according to an embodiment of the present invention.

FIG. 16 is a schematic structural diagram of an electronic device according to an embodiment of the present invention. It should be understood that FIG. 16 merely schematically shows various modules, these modules may be virtual software modules or actual hardware modules, and the combination and splitting of these modules and the adding of the remaining modules shall all fall within the protection scope of the present invention.

As shown in FIG. 16, an electronic device 600 is embodied in the form of a general-purpose computing device. The components of the electronic device 600 may include, but are not limited to: at least one processing unit 610, at least one storage unit 620, a bus 630 for connecting different platform components (including the storage unit 620 and the processing unit 610), and a display unit 640.

The storage unit stores program codes, and the program codes may be executed by the processing unit 610, so that the processing unit 610 performs the steps of the control method for a vehicle interior system according to any one of the foregoing embodiments. For example, the processing unit 610 may perform the steps as shown in FIGS. 7 to 12.

The storage unit 620 may include a readable medium in the form of a volatile memory unit, such as a random access memory (RAM) 6201 and/or a cache 6202, and may further include a read-only memory (ROM) 6203.

The storage unit 620 may further include a program/utility tool 6204 having one or more program modules 6205, such program modules 6205 including but not limited to: an operating system, one or more application programs, and other program modules and program data, where each of or a certain combination of these examples may include the implementation of a network environment.

The bus 630 may represent one or more of several types of bus structures, including a storage unit bus or storage unit controller, a peripheral bus, a graphics acceleration port, a processing unit, or a local area bus using any of a variety of bus structures.

The electronic device 600 may also communicate with one or more external devices 700, and the external devices 700 may be one or more of devices such as a keyboard, a pointing device, and a Bluetooth device. These external devices 700 enable a user to interact and communicate with the electronic device 600. The electronic device 600 can also communicate with one or more other computing devices, and the computer devices include a router and a modem. The communication may be performed via an input/output (I/O) interface 650. In addition, the electronic device 600 may also communicate with one or more networks (e.g., a local area network (LAN), a wide area network (WAN), and/or a public network, such as the Internet) via a network adapter 660. The network adapter 660 may communicate with other modules of the electronic device 600 through the bus 630. It should be understood that, although not shown in the figure, other hardware and/or software modules may be utilized in conjunction with the electronic device 600, including but not limited to: microcodes, a device driver, a redundant processing unit, an external disk drive array, a RAID system, a tape drive, a data backup storage platform, etc.

An embodiment of the present invention further provides a computer-readable storage medium for storing a program, where when the program is executed, the control method for a vehicle interior system according to any one of the foregoing embodiments is implemented. In some possible implementations, various aspects of the present invention may also be implemented in the form of a program product including program codes, where when the program product is run on a terminal device, the program codes are used to enable the terminal device to perform the control method for a vehicle interior system according to any one of the foregoing embodiments.

As described above, by using the computer-readable storage medium in the present invention, the movement of the interior assembly can be adjusted in real time in above, according to the disclosure ensure that the interior assembly moves stably and accurately; and when the interior assembly is interfered with by a foreign object, response can be made in time to avoid damage to the interior assembly, prevent an occupant from being injured, and improve user experience.

Figure 17:
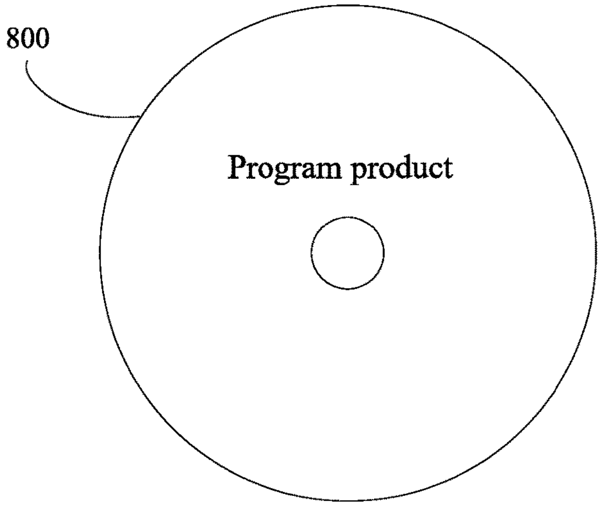
FIG. 17 is a schematic structural diagram of a computer-readable storage medium according to an embodiment of the present invention.

FIG. 17 is a schematic structural diagram of a computer-readable storage medium according to the present invention. Referring to FIG. 17, a program product 800 according to an implementation of the present invention for implementing the above method is described. The program product may be a portable compact disk read-only memory (CD-ROM), and includes program codes, and may be run on a terminal device, for example, a personal computer. However, the program product of the present invention is not limited thereto. The readable storage medium herein may be any tangible medium containing or storing a program which may be used by or in combination with an instruction execution system, apparatus or device.

The program product may be a readable medium or any combination of more readable media. The readable medium may be a readable signal medium or a readable storage medium. An example of the readable storage medium may be, but is not limited to electric, magnetic, optical, electromagnetic, infrared, or semiconductor systems, apparatuses or devices, or any combination of the above. A more specific example of the readable storage medium includes, but is not limited to: an electrical connection having one or more wires, a portable disk, a hard disk, a random access memory (RAM), a read only memory (ROM), an erasable programmable read only memory (EPROM or flash), fiber optics, a portable compact disk read only memory (CD-ROM), an optical storage device, a magnetic storage device, or any suitable combination thereof.

The computer-readable storage medium may include data signals in a baseband or propagated as parts of carriers, in which readable program codes are carried. The propagated data signal may be in various forms, including but not limited to an electromagnetic signal, an optical signal, or any suitable combination thereof. The readable storage medium may also be any readable medium beyond the readable storage media. The readable medium is capable of sending, propagating or transmitting a program used by or in combination with an instruction execution system, apparatus or device or a combination. The program codes contained in the readable medium may be transmitted by any appropriate medium, including but not limited to wireless, wired, optical cable, RF, etc., or any appropriate combination of the above.

A program code for executing operations of the present invention may be compiled using one or more programming languages. The programming languages include object-oriented programming languages, such as Java and C++, and also include conventional procedural programming languages, such as "C" language or similar programming languages. The program code may be completely executed on a computing device of a user, partially executed on a user device, executed as a separate software package, partially executed on a computing device of a user and partially executed on a remote computing device, or completely executed on a remote computing device or server. In the circumstance involving a remote computing device, the remote computing device may be connected to a user's computing device over any type of network, including a local area network (LAN) or wide area network (WAN), or may be connected to an external computing device (for example, connected over the Internet using an Internet service provider).

The above is a further detailed description of the present invention with reference to the specific preferred embodiments, and it cannot be considered that the specific implementation of the present invention is limited to these descriptions. For those of ordinary skill in the art of the present invention, several simple deductions or substitutions can be made without departing from the spirit of the present invention, which should be regarded as falling within the scope of protection of the present invention.

The invention claimed is:

1. A control method for a vehicle interior system, comprising:

generating an interior control signal based on a travelling mode of a vehicle, wherein the interior control signal carries parameter information representing a driving force, a target motion trajectory, and a target position;

driving, by using the driving force, an interior assembly of the vehicle to switch motion between an in-service state and a received state; and monitoring a current motion trajectory of the interior assembly, when the current motion trajectory matches the target motion trajectory, maintaining the driving force until the interior assembly moves to the target position and is then locked, and when the current motion trajectory does not match the target motion trajectory, performing impedance intervention on the driving force, wherein performing impedance intervention on the driving force comprises:

obtaining a position difference between the current motion trajectory and the target motion trajectory at a current moment;

when the current motion trajectory lags behind the target motion trajectory, increasing the driving force based on the position difference, and returning to monitoring the current motion trajectory of the interior assembly; and when the current motion trajectory precedes the target motion trajectory, decreasing the driving force based on the position difference, and returning to monitoring the current motion trajectory of the interior assembly.

2. The control method according to claim 1, wherein after the driving force is increased, when it is detected that the current motion trajectory does not match the target motion trajectory, the control method further comprises:

determining whether the increased driving force reaches a preset maximum value; if the increased driving force reaches the preset maximum value, stopping providing the driving force such that the interior assembly stops moving; and resetting the interior control signal when a number of times the interior assembly stops is less than a preset number of times, and controlling, when the number of times the interior assembly stops reaches the preset number of times, the interior assembly to move in a reverse direction; and if the increased driving force does not reach the preset maximum value, returning to increasing the driving force until the interior assembly moves to the target position.

3. The control method according to claim 2, wherein the controlling, when the number of times the interior assembly stops reaches the preset number of times, the interior assembly to move in a reverse direction comprises:

generating a reverse control signal based on a current position of the interior assembly, wherein the reverse control signal carries parameter information representing a reverse driving force, a reverse motion trajectory, and an initial position;

determining whether an interference force acting on the interior assembly is less than a preset value;

if the interference force is less than the preset value, maintaining the reverse driving force, and controlling the interior assembly to move to the initial position along the reverse motion trajectory and then to be locked; and if the interference force is not less than the preset value, stopping providing the driving force such that the interior assembly stops moving, and locking the interior assembly in a stop position of the interior assembly.

4. The control method according to claim 3, wherein when the current motion trajectory lags behind the target motion trajectory, the control method further comprises:

detecting a type and position of an obstacle acting on the interior assembly; and determining a motion speed of the reverse motion trajectory and a value of the maximum value based on the type and position of the obstacle, so that when a human body is clamped, the motion speed of the reverse motion trajectory is greater than a motion speed of the target motion trajectory, and the value of the maximum value when the obstacle is a human body is less than the value of the maximum value when the obstacle is an object.

5. The control method according to claim 1, wherein the driving force is adjusted based on the position difference, a mass of the interior assembly, an interference force acting on the interior assembly, and an internal impedance of the interior assembly; and the driving force is in direct proportion to each of the position difference, the mass of the interior assembly, the interference force acting on the interior assembly, and the internal impedance of the interior assembly.

6. The control method according to claim 1, wherein after the driving force is decreased, when it is detected that the current motion trajectory does not match the target motion trajectory, the control method further comprises:

determining whether the decreased driving force reaches a preset minimum value; if the decreased driving force reaches the preset minimum value, stopping providing the driving force such that the interior assembly stops moving, and locking the interior assembly in a stop position of the interior assembly; and if the decreased driving force does not reach the preset minimum value, returning to decreasing the driving force until the interior assembly moves to the target position.

7. The control method according to claim 1, wherein the travelling mode comprises a start mode and an autonomous driving mode, and the interior control signal comprises an interior in-service signal and an interior receiving signal;

in the start mode, the interior in-service signal is generated; and in the autonomous driving mode, the interior receiving signal is generated.

8. The control method according to claim 7, wherein the interior assembly comprises a flexible steering assembly and a movable driving seat, and in the start mode, the control method further comprises:

detecting a seat belt of the driving seat and a seated pressure; and when a seat belt fastened signal of the driving seat is detected, generating a first interior in-service signal that controls the steering assembly, and generating, based on a preset mapping relationship between the seated pressure and a motion distance of the driving seat, a second interior in-service signal that controls the driving seat.

9. The control method according to claim 8, wherein the autonomous driving mode, the control method further comprises:

detecting a travelling control signal of the vehicle;

when an emergency braking signal is detected, generating an emergency deployment signal that controls the steering assembly, wherein an emergency deployment speed corresponding to the emergency deployment signal is greater than a motion speed corresponding to the first interior in-service signal, and a locked position of the emergency deployment signal is beyond a target position of the first interior in-service signal; and controlling, based on the emergency deployment signal, the steering assembly to perform emergency deployment to the locked position, and controlling an airbag on the steering assembly to be ejected during the emergency deployment.

10. The control method according to claim 1, wherein the control method is used to control a vehicle interior system comprising:

a flexible interior assembly, the flexible interior assembly comprising a collapsible steering wheel, a retractable steering column, and a movable seat, wherein the interior assembly has an in-service state and a received state, and the interior assembly is capable of switching motion between the in-service state and the received state, the vehicle interior system further comprising a sensor assembly, a detection range of which covers the interior assembly, and an electronic control unit connected to each of the interior assembly and the sensor assembly.

11. An electronic device, comprising:

a processor; and a memory storing executable instructions, wherein when the executable instructions are executed by the processor, the control method for a vehicle interior system according to claim 1 is implemented.

12. A computer-readable storage medium for storing a program, wherein when the program is executed by a processor, the control method for a vehicle interior system according to claim 1 is implemented.

13. A control method for a vehicle interior system, comprising:

generating an interior control signal based on a travelling mode of a vehicle, wherein the interior control signal carries parameter information representing a driving force, a target motion trajectory, and a target position;

driving, by using the driving force, an interior assembly of the vehicle to switch motion between an in-service state and a received state; and monitoring a current motion trajectory of the interior assembly, when the current motion trajectory matches the target motion trajectory, maintaining the driving force until the interior assembly moves to the target position and is then locked, and when the current motion trajectory does not match the target motion trajectory, performing impedance intervention on the driving force, wherein the travelling mode comprises a start mode and an autonomous driving mode, and the interior control signal comprises an interior in-service signal and an interior receiving signal;

in the start mode, the interior in-service signal is generated; and in the autonomous driving mode, the interior receiving signal is generated, wherein the interior assembly comprises a flexible steering assembly and a movable driving seat, and in the start mode, the control method further comprises:

detecting a seat belt of the driving seat and a seated pressure; and when a seat belt fastened signal of the driving seat is detected, generating a first interior in-service signal that controls the steering assembly, and generating, based on a preset mapping relationship between the seated pressure and a motion distance of the driving seat, a second interior in-service signal that controls the driving seat.

* * * * *